United States Patent [19]

Fischer et al.

[11] Patent Number: 5,200,161
[45] Date of Patent: Apr. 6, 1993

[54] PROCESS FOR THE SEPARATION OF HYDROGEN CYANIDE FROM GASES AND WASTE GASES

[75] Inventors: Joachim Fischer, Rodenbach; Hubert Wolf, Hammersbach; Manfred Diehl, Frankfurt, all of Fed. Rep. of Germany

[73] Assignee: Degussa Aktiengesellschaft, Frankfurt am Main, Fed. Rep. of Germany

[21] Appl. No.: 878,916

[22] Filed: May 6, 1992

[30] Foreign Application Priority Data

May 23, 1991 [DE] Fed. Rep. of Germany ....... 4116840

[51] Int. Cl.$^5$ ................... C01C 3/00; G01N 25/08
[52] U.S. Cl. ..................................... 423/236; 436/150
[58] Field of Search .......................... 423/236; 436/150

[56] References Cited

U.S. PATENT DOCUMENTS 2,859,090 11/1958 Karchmer et al. ..................... 23/2
4,172,880 10/1979 Tzavos ............................. 423/236
4,731,232 3/1988 Fischer et al. ..................... 423/236
4,844,874 7/1989 de Vlies ........................... 423/236

FOREIGN PATENT DOCUMENTS 0169305 1/1986 European Pat. Off. .
3534677 4/1987 Fed. Rep. of Germany .
3936082 5/1991 Fed. Rep. of Germany .
2321929 3/1977 France .

Primary Examiner—Gregory A. Heller
Attorney, Agent, or Firm—Beveridge, DeGrandi, Weilacher & Young

[57] ABSTRACT

A process is disclosed for the separation of hydrogen cyanide from gases and waste gases by a throughflow or circulation scrubbing, in which formaldehyde is added at a controlled rate to the aqueous scrubbing liquid to form glycol nitrile. This addition is controlled by measuring the HCN tension in a measuring stream which has been branched off and which is first treated with hydrogen peroxide so that free $H_2O_2$ is still detectable after 1 to 100 seconds and the pH is adjusted to a constant value before measurement of the HCN tension is carried out. The process prevents overdosing with formaldehyde which could not always be prevented in previously known processes in which the addition of formaldehyde was regulated by measuring the cyanide specific redox potential.

7 Claims, No Drawings

PROCESS FOR THE SEPARATION OF HYDROGEN CYANIDE FROM GASES AND WASTE GASES

INTRODUCTION AND BACKGROUND

The present invention relates to a process for the separation of hydrogen cyanide from gases and waste gases by a through-flow or circulation scrubbing with an aqueous scrubbing liquid to which formaldehyde is added at a controlled rate for conversion of the hydrogen cyanide into glycol nitrile. This process, which is intended in particular for the treatment of gases from coking plants, pressure gasifications of carbon, refuse pyrolysing plants, blast furnace processes and other reductive combustion processes, not only completely separates off the hydrogen cyanide but at the same time prevents overdosing with formaldehyde.

Gases such as, for example, the gases from coking plants and other gases obtained from the pressure gasification of carbon and from blast furnace processes and refuse pyrolysis must be freed from dust before they are used as fuel gases. This is necessary firstly to conform to the regulations governing large scale firing plants concerning dust emissions and secondly to prevent incrustations in the heating furnace as these would severely reduce the efficiency.

To remove the dust from such gases, it is common practice to first pass the gases through cyclones and then through electric filters and finally subjecting the gases to a wet scrubbing. The pH which is established in the scrubbing water may vary from slightly acid to alkaline, depending on the contents of the gases to be purified.

If the gases to be purified contain hydrogen cyanide, hardly any of this impurity is removed at an acid pH and most of it remains in the fuel gas. If, on the other hand, a slightly alkaline pH becomes established in the gas scrubbing medium, part of the hydrogen cyanide will be absorbed but the major proportion of the HCN remains in the gas. When gases which have been purified in this way are used for combustion, the HCN preferentially burns to $NO_x$, whereby the permissible limits for large scale firing plants; are exceeded and it would only be possible to keep within the allowed limits by adding a DENOX treatment plant.

One possible method of completely removing HCN consists of scrubbing carried out at a strongly alkaline pH. Since, however, all the $CO_2$ in the gas would have to be scrubbed out at the same time, this method would require an immense consumption of chemicals, which would not only entail very high costs but would also increase the salt content of the effluent to an unacceptable degree.

It has been found that HCN can be separated from gases both in an acidic and in an alkaline pH range if formaldehyde is added to the scrubbing circulation. DE-PS 35 34 677 describes a process for the treatment of effluent from gas scrubbers in which the cyanide specific redox potential is measured in the presence of Ag ions in a side stream which has been conditioned to the required pH, and formaldehyde is introduced into the main stream in an amount depending on the deviation measured so as to convert the HCN dissolved in the scrubbing water and the free cyanide into glycol nitrile. If, however, the scrubbing water also contains sulphide ions, as is the case when scrubbing is carried out on $H_2S$— containing gases from combustion processes operated under reducing conditions, and if it contains thiocyanate, the presence of only 1 mg of sulphide per liter in combination with thiocyanate (which can easily form from cyanide and sulphide) is sufficient to produce a redox potential corresponding to a concentration of 1 g of CN/liter. In that case, overdosing of formaldehyde would occur and this would entail additional costs and result in an unacceptable increase in the CSB. It must also be remembered that free formaldehyde is toxic to fishes and bacteria.

The above-mentioned document also discloses an oxidative treatment of effluent containing glycol nitrile with hydrogen peroxide, which may be carried out either in the scrubbing circulation or in the effluent flushed out of the circulation.

It is an object of the present invention to improve the process disclosed in DE-PS 35 34 677 so that not only hydrogen cyanide will be removed quantitatively from the gases to be scrubbed but overdosing with formaldehyde will be reliably prevented. The process should be suitable in particular for the treatment of gases which contain hydrogen sulphide in addition to hydrogen cyanide. It was also desired to devise a further principle for controlling the dosing of formaldehyde.

SUMMARY OF THE INVENTION

A process has now been found for the separation of hydrogen cyanide from gases and waste gases by a through-flow or circulation scrubbing with an aqueous scrubbing liquid to which formaldehyde is added at a controlled rate in the form of an aqueous solution for converting the hydrogen cyanide into glycol nitrile, the addition of formaldehyde being controlled by the deviation of a measured value determined at constant pH in a measuring stream which has been branched off from the scrubbing liquid leaving the gas scrubber, wherein an aqueous solution of hydrogen peroxide is added to the measuring stream in such a quantity that free hydrogen peroxide can still be detected after a contact time of from 1 to 100 seconds, and the HCN tension across the measuring stream which has been treated and adjusted to a constant pH of from 2 to 11 is then determined as the measured value.

Preferred aspects of the invention include adjusting the pH of the measuring stream at a constant value of 5 to 9.

Further, the gas scrubbing can be carried out in a scrubbing circulation with one or more gas scrubbers and formaldehyde is added to the scrubbing liquid before entry of the scrubbing liquid into the gas scrubbers.

The hydrogen peroxide can be added in a quantity to the measuring stream so that the measuring cell for determining the HCN tension still contains from 20 to 200 mg of $H_2O_2$ per liter of measuring stream.

The scrubbing liquid leaving the gas scrubber within a washing circulation or flushed out of the gas scrubber or the washing circulation is subjected to oxidation, preferably using $H_2O_2$.

In further detail, the analog output of a continuously measuring apparatus for determining the HCN is switched to an electronic control operating at P, PI and PID mode or a stored program control and the dosing device for the aqueous formaldehyde solution is activated and controlled according to the deviation of the potential from the nominal value.

DETAILED DESCRIPTION OF INVENTION

It was found that the HCN tension across an aqueous solution containing HCN and cyanide is almost proportional to the free cyanide content (HCN+CN$^-$) in this solution. This dependence, however, could not be used for controlling the dosing with formaldehyde because the presence of substances with a reducing action which may be present together with HCN in the aqueous phase and in the gaseous phase has a strong influence on the measurement of the HCN tension and leads to faulty results. Hydrogen sulphide, which is almost invariably present in gases obtained from sulphur-containing fuels under reducing conditions, proved to be particularly disturbing. Although the interference by hydrogen sulphide can to a large extent be suppressed by raising the pH of the solution, for example to 12, this at the same time reduces the HCN tension to such an extent that reliable control of the formaldehyde dosing can no longer be ensured. It was surprisingly found that the interfering effect of H$_2$S on the measurement of the HCN tension could be overcome by adjustment to a constant pH and addition of a sufficient quantity of aqueous hydrogen peroxide solution. The preliminary treatment according to the invention of the solution to be measured enables the cyanide content, which is proportional to the HCN tension, to be used for correct dosing of formaldehyde into the aqueous scrubbing liquid.

Conventional gas scrubbers such as trickling towers, columns of filling bodies, plate towers and absorption machines with or without moving parts may be used for the gas scrubbing, which may be carried out as a throughflow scrubbing or as a circulation scrubbing. Each gas scrubbing may comprise one or more gas scrubbers optionally arranged in series. In order to keep the quantity of scrubbing water required as low as possible, it is preferred to employ circulation scrubbing in which the scrubbing liquid is kept in circulation while only a proportion of this liquid is flushed out for further discharge of unwanted substances. If required, the circulation scrubbing includes a device for cooling the scrubbing liquid before its re-entry into the gas scrubber or scrubber. The glycol nitrile resulting from the scrubbing and dissolved in the scrubbing water is preferably broken down by oxidation, preferably by treatment with hydrogen peroxide at pH values of from 8.5 to 12.5, in particular in the region of 10.5. This oxidative treatment may be integrated with the scrubbing circulation or carried out on the scrubbing liquid leaving the gas scrubber or discharged from a scrubbing circulation. The oxidation with hydrogen peroxide may be controlled potentiometrically in known manner.

The formaldehyde is preferably added to the scrubbing liquid before the latter enters the scrubber(s). Hydrogen cyanide is thereby quantitatively converted into glycol nitrile during the scrubbing operation before the cyanide is able to react with any heavy metals present to form heavy metal cyano complexes which would be difficult to detoxify.

The measuring stream is branched off from the scrubbing liquid leaving the gas scrubber(s). The ratio by volume of the measuring stream to the main stream is generally in the range of from 1:100 to 1:10,000. The whole stream of scrubbing liquid could in principle be used as measuring stream but this is generally a disadvantage because it would require the whole stream to be adjusted to a constant pH and a correspondingly large quantity of hydrogen peroxide would have to be added.

The pH in the measuring stream may be adjusted to a constant value of from 2 to 11, preferably from pH 5 to 9, in particular from 6 to 7. The usual acids or bases may be used for adjusting the pH, preferably mineral acids and alkali liquors.

The components of the scrubbing water which interfere with the measurement of HCN tension are rendered harmless by the oxidation produced by the treatment of the measuring stream with hydrogen peroxide, which is used as aqueous hydrogen peroxide at any concentration, preferably at about 30 to 70% by weight of H$_2$O$_2$. The oxidation of H$_2$S and sulphide by H$_2$O$_2$ is virtually instantaneous so that the residence time required for uniform mixing of the aqueous H$_2$O$_2$ solution with the measuring stream is generally sufficient for obtaining an accurate measurement of HCN tension. Measurement of the HCN tension may be carried out if hydrogen peroxide can still be detected after the usual mixing time of from 1 to 100 seconds, in most cases only a few seconds. The dosing with H$_2$O$_2$ is advantageously adjusted so that after oxidation of the components which are easily oxidized under the given conditions, the measuring stream in the measuring cell for measurement of the HCN tension still contains from 20 to 200 mg of H$_2$O$_2$/l, preferably 100±50 mg H$_2$O$_2$/l. It is sufficient to be able to demonstrate the presence of an H$_2$O$_2$ excess by means of, for example, ordinary commercial test rods. Virtually no reaction between any free cyanide still present and H$_2$O$_2$ to give rise to cyanate takes place under the conditions of oxidation. The measuring stream which, as indicated above, has been conditioned and adjusted to a constant pH, is conducted into a measuring cell for determining the HCN tension. If substantial fluctuations in temperature occur in the measuring stream, the measuring cell should be equipped for thermostatic control. The HCN measuring apparatus used may be an HCN sensitive gas measuring apparatus such as the Compur Statox HCN measuring apparatus manufactured by Bayer Diagnostic, which has a measuring range of from 0 to 30 ppm HCN and an analog output of 0 to 1 V. This 0 to 1 V output is converted into a digital 0 to 20 mA signal by an electronic control operating in the P (proportional), PI (proportional-integral) or PID (proportional-integral-differential) mode or by means of a stored program control. This signal is then used for activating and controlling a formaldehyde dosing device according to the deviation from the nominal potential value, for example for adjusting the stroke of a dosing pump for correct dosing of formaldehyde.

The process according to the invention results in quantitative separation of HCN from gases and waste gases having varying HCN contents and optionally also containing other noxious substances, such as H$_2$S. The new control concept reliably avoids an excess of formaldehyde so that the CSB content in the effluent is not increased unnecessarily. Since the process is controlled by a measured value determined in a measuring stream, only the very small measuring stream needs generally be conditioned, not the main quantity of scrubbing water leaving the scrubber or scrubbing circulation.

The invention will now be further illustrated with the aid of the following Examples.

EXAMPLES

Example 1

This Example illustrates the influence of $H_2CO$ dosing on the lowering of the HCN tension.

4 Liters of tap water were adjusted to pH 6.5 in a 5-liter round bottomed flask equipped with stirrer, column of filling bodies and thermostatic control and adjusted to 50° C. 20 mg of $CN^-/l$ were then added in the form of NaCN, the pH was readjusted, 2 liters of water per hour were circulated through the column of filling bodies and 2 m³ of air per hour were added in countercurrent over the liquid surface of the round bottomed flask. The conditions were then readjusted in an evaporation cooler.

25% of the theoretical amount of $H_2CO$, based on the total quantity of cyanide in the round bottomed flask, were added at intervals of 10 minutes and the HCN tension was directly measured over the column of filling bodies by means of an HCN measuring apparatus of the type of Compur Monitox SD, HCN, manufactured by Bayer Diagnostic, before the next addition of $H_2CO$. The measured values given in Table 1 show that almost continuous decrease in the HCN tension takes place with increasing addition of $H_2CO$.

TABLE 1

| $H_2CO$ % of the theoretical based on total cyanide | HCN ppm in the exhaust air |
| --- | --- |
| 0 | 18.0 |
| 25 | 14.0 |
| 50 | 9.7 |
| 75 | 5.8 |
| 100 | 2.1 |
| 112 | 0 |
| (Extrapolation of the straight line) | |

Example 2

Example 2 demonstrates the effectiveness of the addition of $H_2CO$ in lowering the HCN tension on an industrial scale.

Doses of aqueous formaldehyde (37% by weight) adjusted to fixed quantities were added to a 1300 m³/h stream of effluent from a blast furnace circulation scrubbing which was at a pH of 6 to 9 and contained an average of 240 mg of $CN^-/l$ and in addition up to 50 mg of $S^{2-}/l$ and up to 2000 mg of $SCN^-/l$, and the doses of formaldehyde added were in each case kept constant for one hour.

Before the main stream entered the settling tank, a measuring stream of about 100 liters of effluent per hour was removed with an elastic tube pump and 50 ml of $H_2O_2$, 35% by weight, per hour were added to this measuring stream and the pH was automatically controlled to be kept constant at 6.5. This conditioned measuring stream was then passed through a stirrer vessel equipped with a Compur Statox HCN measuring apparatus. 550, 770, 800 and 880 liters of aqueous formaldehyde solution (37% by weight) were then added directly after the gas scrubber, the HCN tension was monitored at 50° C. and the final HCN tension was measured after a dosing time of one hour.

The reaction time from the point of introduction of $H_2CO$ to removal of the measuring stream amounted to about 40 seconds. A distinct fall in the measured HCN tension was observed only 60 seconds after $H_2CO$ began to be added, and the remaining HCN tension stabilized after only 90 seconds. The measured values shown in the Table constitute a linear decrease in HCN tension in dependence upon the dosing of $H_2CO$.

TABLE 2

| Formaldehyde (37% by weight) l | HCN Tension ppm |
| --- | --- |
| 0 | 240 |
| 550 | 96 |
| 750 | 50 |
| 800 | 30 |
| 880 | 2 |

Example 3

Example 3 serves to show the possibility of reliably controlling the introduction of the required amount of $H_2CO$ on an industrial scale.

A small measuring stream (100 l/h) was removed from a stream of effluent described in Example 2 (operating temperature about 50° C.), 50 ml of aqueous $H_2O_2$ (35% by weight) were added to this measuring stream and the pH was automatically kept constant at 6.5. This conditioned measuring stream was then passed through a stirrer vessel equipped with a Compur Statox HCN measuring apparatus (Bayer Diagnostic Company), measuring range 0 to 30 ppm HCN=0 to 1 V analog output. The 0 to 1 V analog output was connected to an electronic control (Model PR 12, manufactured by Dr. Kuntze, Düsseldorf) and converted into a digital 0 to 20 mA output. The adjustment on the control is carried out in such a manner that a control output of 20 mA is obtained when the input is 100 mV and a control output of 0 mA is obtained when the input is 100 mV and a control output of 0 mA is obtained when the input is 0 mV. The control output of 0 to 20 mA was used in the indicated manner for activating the automatic stroke adjustment of a dosing pump (Model Macro TZ 6 HM 15-120/8, manufactured by ProMinent). The control output of 0 to 20 mA corresponds to a dosing performance of 0 to 1000 l/h.

The reason why the control adjustment was carried out in this manner is that permissible limit value for HCN was 5 ppm and at a measuring range of from 0 to 30 ppm and an analog output of 1000 mV of the HCN measuring apparatus, 100 mV corresponds to only 3 ppm of HCN so that the resulting value will be sure to fall below the permissible limit.

Analyses of the treated effluent have shown that over a period of 24 hours, the maximum $H_2CO$ content (photometric determination according to Hantzsch) in the effluent was 3.6 mg/l; the average was 1.1 mg $H_2CO/l$. The HCN tension at the cooling tower was always <5 ppm. A small proportion of the scrubbing water was always removed from the cooling circulation downstream of the cooler for oxidative after-treatment with $H_2O_2$ and replaced by fresh water.

Example 4

Example 4 serves to demonstrate the possibility of reliably removing HCN by automatically controlled dosing of $H_2CO$.

A measuring stream of 50 l/h was removed from a scrubbing circulation of a pressure gasification of carbon in which the circulation was 36 m³/h, the temperature 120° C. and the pressure 36 bar. The measuring stream was cooled to room temperature through a cooling coil. 100 ml of $H_2O_2$ solution (35% by weight) were added per hour and the pH was automatically kept constant at 6.5. This conditioned measuring stream was then passed through a stirrer vessel and the HCN tension was monitored with an HCN measuring apparatus (Compur Monitox SC, HCN). The output of the Lewa dosing pump for dosing the aqueous $H_2CO$ solution into the scrubbing liquid before the scrubber was adjusted so that the HCN tension could be maintained at 1 to 5 ppm HCN. Analytical monitoring of the HCN concentration in the pure gas by gas chromatography invariably showed a residual concentration of less than 5 ppm of HCN over a period of 10 hours when the initial HCN contents were from 50 to 100 ppm. The average $H_2CO$ requirement was in this case 5 liters of aqueous $H_2CO$ solution (37% by weight) per hour. The analytically determined residual formaldehyde content in the discharged effluent was invariably below 1 mg/l. Since ammonia was also present in the effluent, the analytically determined formaldehyde was in reality in the form of urotropin.

Further variations and modifications of the foregoing will be apparent to those skilled in the art and are intended to be encompassed by the claims appended hereto.

German priority application P 41 16 840.2 is relied on and incorporated herein by reference.

We claim:

1. A process for the separation of hydrogen cyanide from gases containing in addition to hydrogen cyanide, also hydrogen sulfide comprising scrubbing said gases in a gas scrubber with an aqueous scrubbing liquid to which formaldehyde in the form of an aqueous solution is added at a controlled rate for conversion of the hydrogen cyanide in said gases into glycol nitrile, branching off a measuring stream from the scrubbing liquid leaving the gas scrubber, controlling said rate by the deviation of a measured value determined at a constant pH in said measuring stream which is branched off from the scrubbing liquid leaving the gas scrubber, adding an aqueous hydrogen peroxide solution to said measuring stream in such a quantity that free hydrogen peroxide can still be detected after a contact time in the range of from 1 to 100 seconds, and the hydrogen cyanide tension across the measuring stream which has been treated thereby and adjusted to a constant pH of from 5 to 9 is determined as the measured value.

2. The process according to claim 1, wherein the pH is adjusted to 6 to 7.

3. The process according to claim 1, further comprising carrying out the gas scrubbing in a scrubbing circulation with one or more gas scrubbers and adding formaldehyde to the scrubbing liquid before entry of said scrubbing liquid into said gas scrubber.

4. The process according to claim 1, wherein hydrogen peroxide is added in such a quantity to the measuring stream that the measuring cell for determining the HCN tension still contains from 20 to 200 mg of $H_2O_2$ per liter of measuring stream.

5. The process according to claim 1, wherein the scrubbing liquid leaving the gas scrubber is treated to oxidation.

6. The process according to claim 5, wherein said oxidation is carried out by using hydrogen peroxide.

7. The process according to claim 1, further comprising continuously measuring the HCN tension and obtaining an analog output thereby, switching said output to an electronic control operating at P, PI or PID mode or a stored program control and activating the addition for the aqueous formaldehyde solution and controlling the rate of addition according to the deviation of the potential from the nominal value.

* * * * *